Patented Sept. 17, 1940

2,215,398

UNITED STATES PATENT OFFICE 2,215,398

PROCESS FOR THE MANUFACTURE OF SYNTHETIC ALPHA-TOCOPHEROL

Paul Karrer, Zurich, Switzerland, assignor to Hoffmann-La Roche Inc., Nutley, N. J., a corporation of New Jersey No Drawing. Application May 12, 1939, Serial No. 273,345. In Switzerland May 24, 1938

1 Claim. (Cl. 260—333)

A racemic condensation product is obtained by the action of trimethyl hydroquinone on phytyl halides which process is the subject matter of U. S. patent application Ser. No. 231,846.

This process is as follows:

A mixture of trimethylhydroquinone, phytyl bromide and dry benzine are heated in the presence of anhydrous zinc chloride to 80° C. in a current of nitrogen for two hours. The product is then decomposed by water, the benzine layer washed with dilute sodium hydroxide and water, dried, and, following this, a chromatogram prepared on aluminum oxide. The upper layer of the chromatogram is eluted by a mixture of methanol and ether and purified by the preparation of a second chromatogram.

It has now been found that this condensation product can be split into the optically active forms with 3-bromcamphor sulphonic acid halide.

The difficultly soluble fraction of the bromcamphor sulphonate crystallises in small needles melting at 48–50° C. This melting point is the same as that of the 3-bromcamphor sulphonate of α-tocopherol. When mixed, the two compounds show no depression of melting-point. The specific rotation of the bromcamphor sulphonate of the condensation product is $$[\alpha] = +30°(\pm 2°)$$

and corresponds to that of the bromcamphor sulphonate of the natural α-tocopherol.

Example 1 part by weight of the condensation product from phytyl bromide and trimethyl hydroquinone is dissolved in 8 parts by weight of absolute pyridine and treated with 3 parts by weight of finely powdered 3-bromcamphor sulphonic acid chloride. The solution is heated for 4 hours to 60–80° C. and then poured into ice water and extracted with ether. The ether extract is successively washed with water, dilute sulphuric acid, bicarbonate solution and finally again with water. After evaporation of the ether, an oil remains which is taken up in 20 parts by weight of absolute alcohol. When this solution is allowed to stand in the cold, a small quantity of an oily product separates first, from which the solution is decanted. After a few days the crystallisation of the bromcamphor sulphonate begins in the solution and increases in the course of a few days. The compound is purified by renewed recrystallisation from absolute alcohol.

The bromcamphor sulphonic acid is removed by alkaline saponification. The properties of the saponification product correspond with those of α-tocopherol.

I claim:

Process for the manufacture of synthetic α-tocopherol, identical with the substance gained from natural sources, comprising treating the racemic-α-tocopherol with 3-bromcamphor sulphonic acid chloride, extracting the condensation product by means of an organic solvent not miscible with water, distilling off the solvent, redissolving the condensation product in alcohol, crystallising the α-tocopherol bromcamphor sulphonate from the solution, hydrolising the crystals by means of a hydrolising agent.

PAUL KARRER.